UNITED STATES PATENT OFFICE.

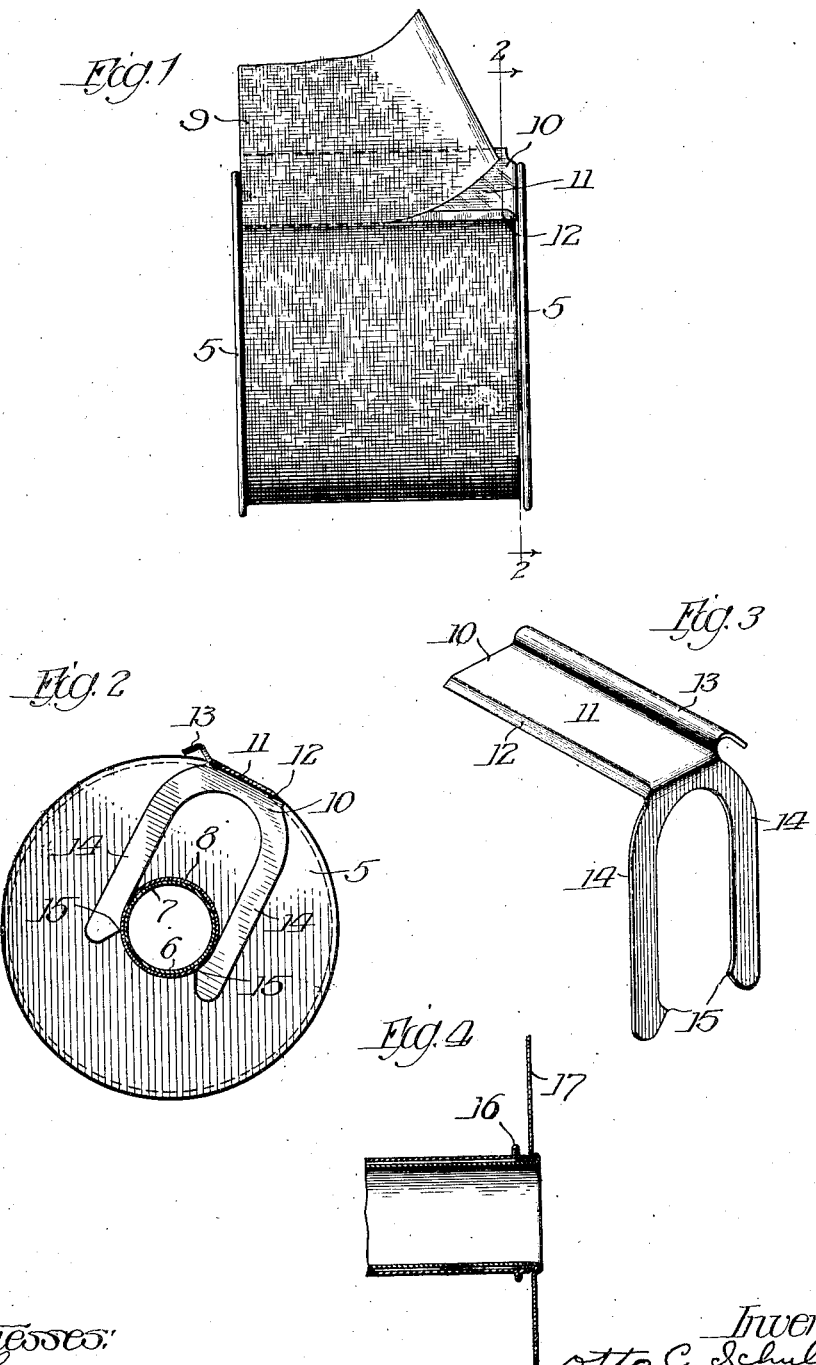

OTTO C. SCHULZ, OF CHICAGO, ILLINOIS, ASSIGNOR TO BAUER & BLACK, OF CHICAGO, ILLINOIS, A CORPORATION OF ILLINOIS.

ADHESIVE-BANDAGE SPOOL.

1,086,472.

Specification of Letters Patent.

Patented Feb. 10, 1914.

Application filed March 1, 1912. Serial No. 680,869.

*To all whom it may concern:*

Be it known that I, OTTO C. SCHULZ, a citizen of the United States, residing at Chicago, in the county of Cook and State of Illinois, have invented certain new and useful Improvements in Adhesive - Bandage Spools, of which the following is a specification.

My invention relates to spools and particularly to spools which are intended to hold adhesive plaster, tape and other similar material and has for its object, broadly, the provision of novel and improved means for cutting off a required length of material which has been unwound from the said spool.

I am aware that numerous forms of cutters have been constructed and employed in connection with spools of this sort to a limited extent prior to my invention but, so far as I am aware, such cutters have heretofore been fastened permanently to the spools or, if detachable, have been secured without the periphery of the spool ends so as to be incapable of movement toward the center of the spool as the size of the roll decreases. The cutter when permanently fastened upon the spool interferes with the winding as the cutter must be rotated continuously about the spool to move it out of the way of the material being wound thereon.

The detachable cutters used prior to my invention have not been constructed or adapted to move radially of the spool to maintain contact with the roll as the material is unwound therefrom. Hence, the cutter could not be pressed against the roll in severing the material but a sufficient length in addition to the length desired must be unwound to reach from the roll to the cutter, which leaves a loose end on the roll after the material is severed. This is objectionable because of the difficulty of severing the material under such conditions, because of the tendency to stretch and distort the material which is severed from the roll as well as the loose end remaining on the roll, and because of the end which is necessarily loosened from the roll to reach the cutter.

The principal object of my invention is to provide a detachable cutter adapted to be engaged with the spool after the roll is wound thereon and movable radially of the spool to follow the roll as material is unwound therefrom. This radial adjustability of the cutter on the spool permits the cutter to be pressed uniformly against the roll so that a clean cut can be easily made at the point where the material leaves the roll. Thus the material is cut as against a straight edge tightly engaging the roll wherever it is desired to sever the material, and the disadvantages of the old style cutter is entirely avoided.

Additional objects and advantages will be apparent as the invention is better understood from the following description and accompanying drawing illustrating one preferred embodiment thereof.

On the drawings—Figure 1 is a side elevation of a spool made in pursuance of my invention, wound with a strip of adhesive plaster; Fig. 2 is a transverse sectional view on the line 2—2—of Fig. 1; Fig. 3 is a perspective view of the cutter adapted to be used in connection with and shown upon the spool in Fig. 1; and Fig. 4 is a sectional view showing a preferred construction of a spool adapted to receive the cutter shown in Fig. 3.

From the drawings it will be observed that the spool comprises a pair of parallel circular ends 5 secured upon a central barrel or core 6 which is preferably formed of the inner hollow metallic cylinder 7 and the outer embracing sleeve 8 upon which it is intended that the strip 9 of any desired material may be wound. The ends 5 of the spool are spaced apart a greater distance than the width of the strip 9 to permit the cutter 10 to be positioned upon the said spool after the strip has been wound thereon, as will be hereinafter disclosed. This cutter, for the purpose of illustrating my invention, is formed of a blade 11 provided with a sharp cutting edge 12. The blade is preferably flat and of sufficient width to permit it to be held against the roll by the thumb of the operator while the cut is made. Upon the back of the said blade may be provided a flange 13 adapted to be pressed by the operator to rotate the cutter into position preparatory to cutting off a desired amount of the material wound upon the spool. It will be obvious, however, that other forms of blades may be used without departing from the spirit and scope of my invention.

Integral with the blade and at one end thereof I have provided the two resilient prongs 14 together forming a yoke disposed in a plane substantially at right angles to the plane of the said blade. These prongs are spaced apart a distance slightly greater than the diameter of the sleeve 8 of the barrel. Adjacent the extremity of each prong I have provided an engaging shoulder 15 extending inwardly between the said prongs.

To aid in winding a spool adapted to be subsequently provided with the cutter hereinbefore described, and to guide the said cutter when in position upon the spool and prevent it from pressing unduly upon the edge of the material wound on the said spool, there may be provided as shown in Fig. 4 upon the barrel of the spool an outwardly extending encircling rib 16 spaced from an end 17 a sufficient distance to permit the prongs 14 of the cutter to be inserted between it and the said end, and of sufficient height to retain the said prongs substantially parallel to the end 17. It will be understood, however, that this feature is not deemed essential to the effective operation of the cutter and may be omitted.

It will be readily seen that a cutter made in pursuance of my invention may be positioned upon a spool after the strip of material has been wound thereon by inserting the prongs between the material and an end of the spool and forcing the shoulders 15 downwardly past the barrel, when the prongs will be disposed on opposite sides thereof and the cutting blade will lie loosely upon the wound strip.

Where a cutter made in pursuance of my invention is employed, it is obvious that the blade will lie in intimate contact with the topmost layer of the strip wound upon the spool regardless of the number of encircling layers disposed thereabout, and that the cutter will be easily rotatable about the barrel of the said spool to permit the material to be unwound therefrom.

It will be obvious, moreover, that various minor changes may be made in the mechanical construction, the arrangement and form of the parts without departing from the spirit and scope of my invention, or sacrificing any of its advantages, the form herein disclosed being merely one preferred embodiment thereof.

I claim:—

1. The combination of a spool, a cutter mounted upon said spool and radially thereof and rotatable thereabout, said cutter being provided with an open-ended yoke embracing the barrel of the spool.

2. The combination of a spool and a cutter having a cutting edge substantially parallel to the barrel of the said spool, and a pair of resilient prongs at one end of said cutter and at right angles to said cutting edge, said prongs being adapted to embrace the barrel of the said spool.

3. The combination of a spool and a cutter having a cutting edge substantially parallel to the barrel of the said spool, and a pair of resilient prongs at one end of said cutter and at right angles to said cutting edge, each of said prongs being provided adjacent its extremity with a shoulder projecting inwardly between the said prongs, said prongs being adapted to embrace the barrel of the said spool and be yieldingly held in place by the said shoulders.

4. The combination of a spool, a strip of material wound thereon, said spool having an end spaced from an edge of said wound strip, the inner face of said end being substantially parallel to the adjacent edge of said strip, and a cutter having a cutting edge disposed transversely of the strip and having a resilient yoke open at its end and embracing the barrel of the spool between the edge of the strip and the end of the spool spaced therefrom, said cutter and yoke being detachable from said spool under force exerted outwardly radially of said spool.

5. A cutter adapted to be rotatably mounted upon a spool, said cutter comprising a blade, a pair of resilient prongs at one end of said blade, said prongs being adapted to embrace the barrel of the said spool.

6. A cutter adapted to be rotatably mounted upon a spool, said cutter comprising a blade, a pair of resilient prongs at one end of said blade, each of said prongs being provided with a shoulder extending inwardly between the said prongs, said prongs being adapted to embrace the barrel of the said spool and to be yieldingly held in place by the said shoulders.

7. A cutter adapted to be rotatably mounted upon a spool, said cutter comprising a blade, a pair of resilient prongs at one end of said blade and at right angles thereto, said prongs being adapted to embrace the barrel of the said spool.

OTTO C. SCHULZ.

Witnesses:
C. H. HYLIN,
J. H. RAPP.